US006781502B1

(12) United States Patent
Robb

(10) Patent No.: US 6,781,502 B1
(45) Date of Patent: Aug. 24, 2004

(54) METHOD OF FORMING A PROTECTION CIRCUIT AND STRUCTURE THEREFOR

(75) Inventor: Stephen P. Robb, Fountain Hills, AZ (US)

(73) Assignee: Semiconductor Components Industries, L.L.C., Phoenix, AZ (US)

(*) Notice: Subject to any disclaimer, the term of this patent is extended or adjusted under 35 U.S.C. 154(b) by 0 days.

(21) Appl. No.: 10/429,399

(22) Filed: May 6, 2003

(51) Int. Cl.[7] .................. H01H 85/044; H01H 85/32; H02H 9/02
(52) U.S. Cl. .................. 337/167; 337/206; 337/221; 361/54; 361/93.1; 361/93.7; 361/101
(58) Field of Search .................. 337/158, 167, 337/206, 221, 242, 266; 361/54, 55, 57, 93.1, 93.7, 100, 101; 327/525; 340/638

(56) References Cited

U.S. PATENT DOCUMENTS

| | | | | |
|---|---|---|---|---|
| 3,074,006 A | * | 1/1963 | Klees | 323/276 |
| 3,078,410 A | * | 2/1963 | Thomas | 323/278 |
| 3,109,980 A | * | 11/1963 | Wiley | 323/278 |
| 3,192,441 A | * | 6/1965 | Wright | 361/18 |
| 3,201,606 A | * | 8/1965 | Mamon | 327/540 |
| 3,317,817 A | * | 5/1967 | Gershen | 323/273 |
| 3,337,744 A | * | 8/1967 | Johnson | 307/86 |
| 3,395,317 A | * | 7/1968 | Hanson | 361/91.6 |
| 3,403,320 A | * | 9/1968 | Whitman, Jr. | 323/276 |
| 3,413,522 A | * | 11/1968 | Beszedics et al. | 361/58 |
| 3,448,342 A | * | 6/1969 | Jacobs | 361/89 |
| 3,473,106 A | * | 10/1969 | Sebastian | 323/277 |
| 3,505,583 A | * | 4/1970 | Branagan | 323/278 |
| 3,509,450 A | * | 4/1970 | McNulty | 323/303 |
| 3,531,712 A | * | 9/1970 | Giuseppe | 323/224 |
| 3,532,936 A | * | 10/1970 | Kuster | 361/92 |
| 3,534,249 A | * | 10/1970 | Neill | 323/312 |
| 3,541,425 A | * | 11/1970 | Weidmann | 323/273 |
| 3,548,294 A | * | 12/1970 | Houghton | 323/277 |
| 3,571,608 A | * | 3/1971 | Hurd | 361/77 |
| 3,588,672 A | * | 6/1971 | Willson | 323/315 |
| 3,668,545 A | * | 6/1972 | Von Recklinghausen | 330/298 |
| 3,697,861 A | * | 10/1972 | Frazier | 323/277 |
| 3,771,021 A | * | 11/1973 | Bierly | 361/18 |
| 3,819,986 A | * | 6/1974 | Fukuoka | 361/56 |
| 3,881,150 A | * | 4/1975 | Gay | 323/311 |
| 3,886,410 A | * | 5/1975 | Seer, Jr. | 361/18 |
| 3,916,220 A | * | 10/1975 | Roveti | 361/98 |
| 4,016,460 A | * | 4/1977 | Stadler | 330/207 P |
| 4,075,546 A | * | 2/1978 | Barber | 323/224 |
| 4,186,418 A | * | 1/1980 | Seiler | 361/91.6 |
| 4,423,431 A | * | 12/1983 | Sasaki | 257/272 |
| 4,429,339 A | * | 1/1984 | Jaeschke et al. | 361/93.7 |
| 4,459,537 A | * | 7/1984 | McWhorter | 323/224 |
| 4,536,699 A | * | 8/1985 | Baker | 323/276 |
| 4,618,812 A | * | 10/1986 | Kawakami | 323/224 |
| 4,661,879 A | * | 4/1987 | Sato et al. | 361/58 |
| 4,691,129 A | * | 9/1987 | Einzinger et al. | 327/434 |
| 4,725,912 A | * | 2/1988 | Wrathall | 361/18 |
| 4,736,268 A | * | 4/1988 | Wagoner | 361/111 |
| 4,752,852 A | * | 6/1988 | Ahl et al. | 361/58 |

(List continued on next page.)

FOREIGN PATENT DOCUMENTS

FR    2469031 A * 5/1981 ............ H02H/7/12

OTHER PUBLICATIONS

Publication Order No. NIF62514/D "Self–Protected FET with Temperature and Current Limit", Apr., 2003—Rev. 3, Semiconductor Components Industries, LLC, 6pps.

*Primary Examiner*—Anatoly Vortman
(74) *Attorney, Agent, or Firm*—Robert F. Hightower

(57) ABSTRACT

A protection circuit (10) is formed to protected a load (11) when a short circuit develops during operation of the load (11). A load transistor (18) is formed to couple the load to a voltage return terminal. A disable transistor (19) is formed to disable the load transistor (18) when a short circuit occurs.

18 Claims, 4 Drawing Sheets

U.S. PATENT DOCUMENTS

| | | | | |
|---|---|---|---|---|
| 4,835,649 A | * | 5/1989 | Salerno | 361/18 |
| 5,006,734 A | * | 4/1991 | Engelbrecht | 327/322 |
| 5,015,918 A | * | 5/1991 | Copeland | 315/76 |
| 5,136,452 A | * | 8/1992 | Orton | 361/33 |
| 5,233,287 A | * | 8/1993 | Lenk | 323/268 |
| 5,319,515 A | * | 6/1994 | Pryor et al. | 361/93.4 |
| 5,381,296 A | * | 1/1995 | Ekelund et al. | 361/106 |
| 5,410,441 A | * | 4/1995 | Allman | 361/18 |
| 5,430,401 A | * | 7/1995 | Shtulman | 327/434 |
| 5,506,493 A | * | 4/1996 | Stengel | 323/223 |
| 5,513,060 A | * | 4/1996 | Bremond | 361/58 |
| 5,519,557 A | * | 5/1996 | Kopera et al. | 361/84 |
| 5,539,603 A | * | 7/1996 | Bingham | 361/56 |
| 5,539,610 A | * | 7/1996 | Williams et al. | 361/246 |
| 5,625,519 A | * | 4/1997 | Atkins | 361/93.7 |
| 5,642,251 A | * | 6/1997 | Lebbolo et al. | 361/84 |
| 5,757,600 A | * | 5/1998 | Kiraly | 361/84 |
| 5,814,979 A | * | 9/1998 | Grimm | 323/284 |
| 5,815,356 A | * | 9/1998 | Rodriguez et al. | 361/91.6 |
| 5,946,270 A | * | 8/1999 | Jang | 367/18 |
| 5,991,134 A | * | 11/1999 | Tan et al. | 361/56 |
| 6,118,641 A | * | 9/2000 | Atkins et al. | 361/58 |
| 6,424,512 B1 | * | 7/2002 | Schmacht | 361/93.1 |
| 6,456,186 B1 | * | 9/2002 | Oglesbee | 337/161 |
| 6,587,027 B1 | * | 7/2003 | Nadd | 337/167 |
| 6,611,410 B1 | * | 8/2003 | Makaran | 361/84 |
| 6,710,698 B1 | * | 3/2004 | Jehlicka et al. | 337/221 |

* cited by examiner

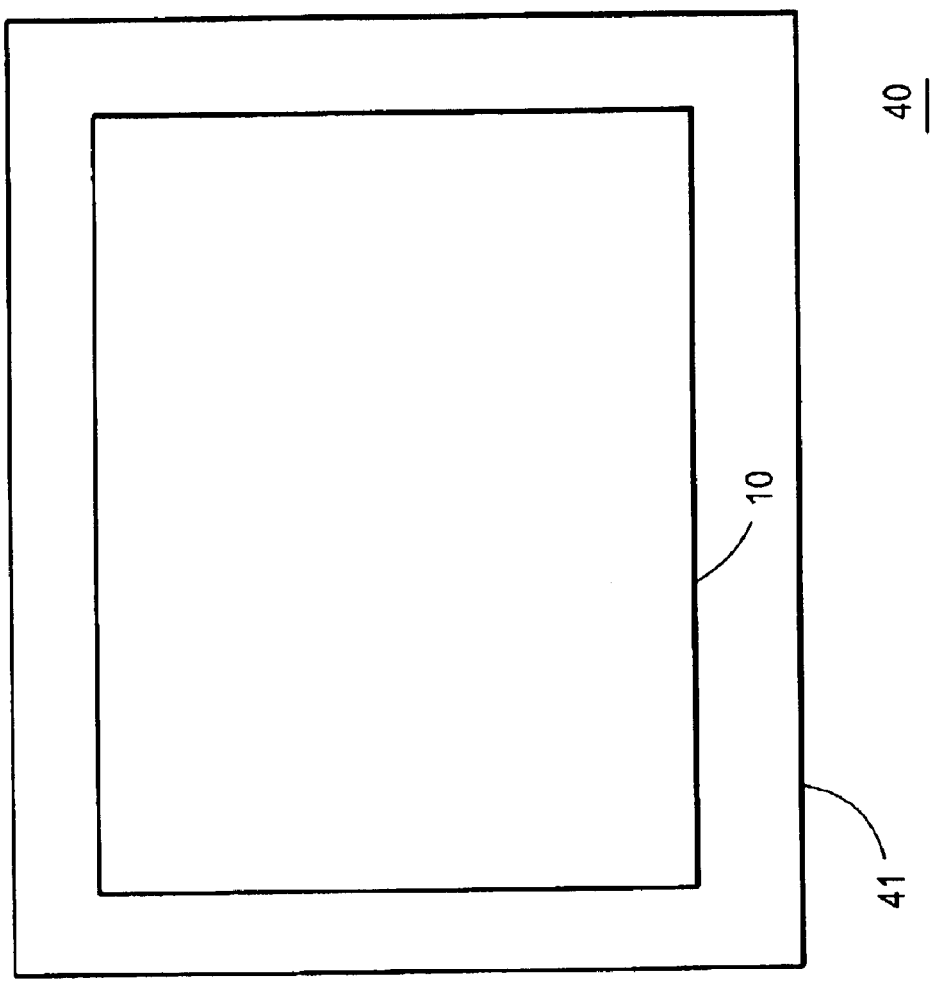

METHOD OF FORMING A PROTECTION CIRCUIT AND STRUCTURE THEREFOR

BACKGROUND OF THE INVENTION

The present invention relates, in general, to electronics, and more particularly, to methods of forming semiconductor devices and structure.

In the past, the electronics industry utilized various methods and devices to protect circuits from shorts and other voltage transient. In some applications it was desirable to plug or unplug electronic circuits from their power source without removing the power. This may occur when a circuit card was inserted or removed from a small system such as a personal computer or from a large system such as a telecommunications system that may have a large rack full of electronic cards. Cards often were removed and re-inserted without powering down the entire system. These situations were referred to as "hot swap" or "hot plug" applications since the power lines remain "hot" during the transfers.

During some hot plug events, the card being plugged in was defective and presented a permanent short to the power bus. This short often pre-existed on the card before it was plugged into the system. Control circuits often were used to detect such shorts that existed as the card was inserted into the system. However, shorts also could develop after the card was plugged into the system. The control circuit did not protect from such a short that developed after the card was inserted. The short often result in damage to the card or to the overall system.

Accordingly, it is desirable to have a method of protecting a circuit from a short that occurs after the card is plugged into a system.

BRIEF DESCRIPTION OF THE DRAWINGS

FIG. 4 schematically illustrates an enlarged plan view of a semiconductor device that includes the protection circuit of FIG. 1 in accordance with the present invention.

For simplicity and clarity of illustration, elements in the figures are not necessarily to scale, and the same reference numbers in different figures denote the same elements. Additionally, descriptions and details of well known steps and elements are omitted for simplicity of the description. As used herein current carrying electrode means an element of a device that carries current through the device such as a source or a drain of an MOS transistor or an emitter or a collector of a bipolar transistor, and a control electrode means an element of the device that controls current through the device such as a gate of an MOS transistor or a base of a bipolar transistor.

DETAILED DESCRIPTION OF THE DRAWINGS

Figure 1:
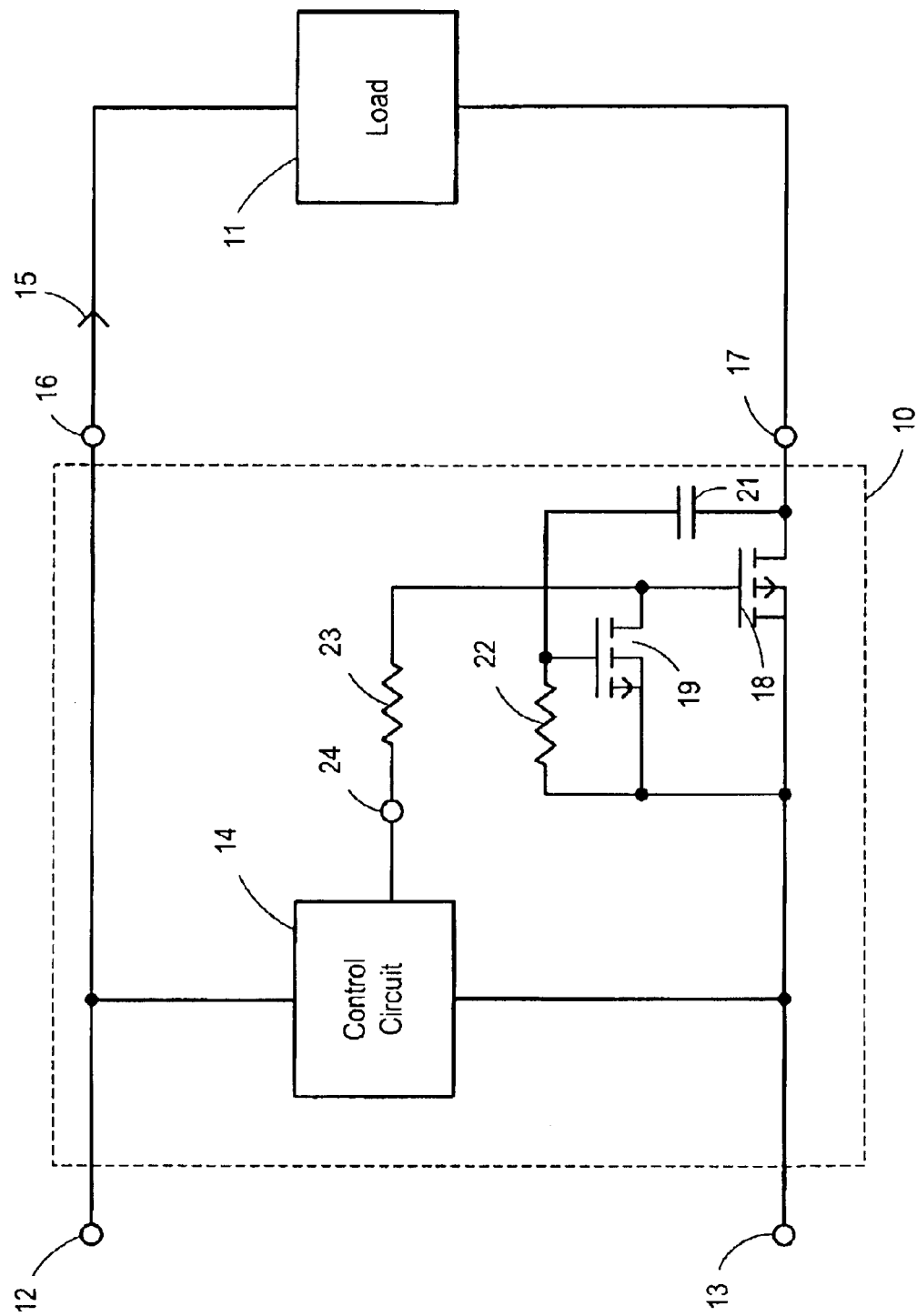
FIG. 1 schematically illustrates an embodiment of a portion of a protection circuit in accordance with the present invention.

FIG. 1 schematically illustrates an embodiment of a portion of a protection circuit 10 that is formed to quickly protect a load 11 from short circuits and other damaging voltages. Circuit 10 includes a control circuit 14, a first transistor or load transistor 18, a second transistor or discharge transistor 19, a coupling capacitor 21, a discharge resistor 22, a voltage input 12, a voltage return 13, a load voltage terminal 16, and a load return terminal or load return 17. Load 11 is coupled between load voltage terminal 16 and load return 17. Load 11 and circuit 10 typically are a portion of a sub-system or a card that is a portion of a larger external system (not shown) that hash cards or elements that are removed and inserted into the external system. For example, load 11 and circuit 10 may be a portion of a line card of a telephone system or a portion of a modem card of a personal computer, or other type of card for another type of system. Circuit 10 is formed to permit connecting load 11 and circuit 10 to the larger external system without removing power from the external system and to protect load 11 during such operations. Typically circuit 10 receives power from the external system on voltage input 12 and voltage return 13. In most situations, the power is applied as the card containing circuit 10 and load 11 are inserted into the external system. Control circuit 14 detects power being applied to input 12 and return 13, and responsively controls transistor 18 to slowly charge load by-pass capacitances and to slowly increase a load current 15, illustrated by an arrow, to load 11 in order to protect load 11 while the power is applied.

Figure 2:
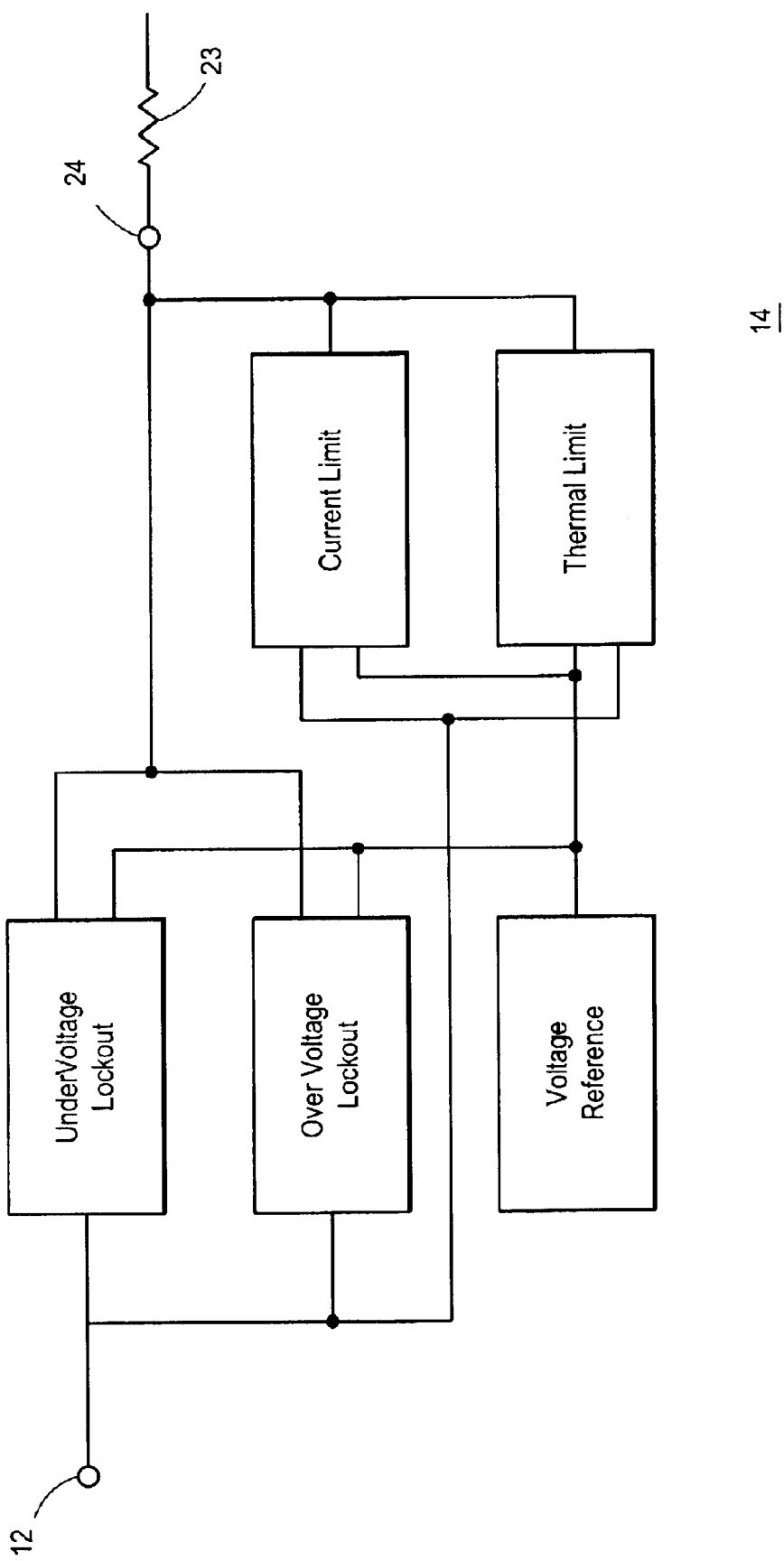
FIG. 2 schematically illustrates a block diagram of an embodiment of a portion of the protection circuit of FIG. 1 in accordance with the present invention.

FIG. 2 schematically illustrates a block diagram of an embodiment of a portion of control circuit 14 that is referred in the description of FIG. 1. Circuit 14 includes a variety of functional blocks that facilitate protecting load 11 when power is applied to load 11. Circuit 14 typically includes an Under Voltage Lockout block, an Over Voltage Lockout block, a Voltage Reference block, a Current Limit block, and a Thermal Limit block. Some blocks may be omitted in other embodiments. Circuit 14 receives the input voltage applied to voltage input 12. The Reference Voltage block provides various reference voltages that are used by each of the other blocks during the operation of circuit 14. The Under Voltage Lockout block typically does not allow circuit 14 to drive output 24, thus does not enable transistor 18, if the input voltage is less than a value established by the Reference Voltage block. The Over Voltage Block reduces the drive to transistor 18 if the input voltage is greater than a desired value. The Current Limit block disables transistor 18 if the current flowing from input 12 to load voltage terminal 16 exceeds a desired value. The Thermal Limit block disables transistor 18 if the temperature of circuit 14 exceeds a desired value. The functions provided by circuit 14 are well known to those skilled in the art.

Referring now to both FIG. 1 and FIG. 2, when power is applied control circuit 14 slowly enables transistor 18 to slowly ramp up a value of load current 15 until control circuit 14 fully enables transistor 18 to provide a low resistance connection between load return 17 and voltage return 13. If a short exists in load 11 when power is applied, control circuit 14 slowly ramps up load current 15 until reaching a current limit value established by the Current Limit block of control circuit 14. Under such a condition, load 11 will continue to consume the high load current value and dissipate the associated power until the Thermal Limit block disables transistor 18. These and other functions of control circuit 14 are well known to those skilled in the art.

Circuit 10 is also formed to include a transient suppression circuit that quickly disables transistor 18 when a short circuit occurs during operation in order to prevent damaging load 11. The transient suppression circuit includes transistor 19, resistor 22, and capacitor 21. Without the transient suppression circuit if a short occurs during the operation of load 11, transistor 18 would be fully enabled in a low resistance state and the short would-cause a very large increase in load current 15. If transistor 18 were to remain enabled, the high value of load current 15 would last until the Thermal Limit block of circuit 14 disabled transistor 18. However, it may take several micro-seconds before the Thermal Limit block reduced load current 15. During this time, load 11 would be damaged. Additionally, a large value of load current 15 may cause the input voltage applied to input 12 to sag and result in incorrect operation of other circuits connected to the power bus of the external system.

The transient suppression circuit is formed to detect the short circuit condition during operation and to disable transistor 18 in order to protect load 11. When a short occurs, the voltage on terminal 16 is coupled to return 17 causing the voltage on return 17 to almost instantaneously increase. The increased voltage is applied to the drain of transistor 18 causing an increased drain-to-source voltage on transistor 18. The increased voltage or voltage step is conducted through capacitor 21 and quickly increases the gate voltage of transistor 19 thereby quickly enabling transistor 19. Transistor 19 then discharges the gate capacitance of transistor 18 and disables transistor 18. Thus, quickly enabling transistor 19 also quickly disables transistor 18 without having to wait for the thermal limit function of circuit 14 to disable transistor 18. Consequently, the function of the transient suppression circuit minimizes damage to load 11. Typically, transistor 19 is enabled when the value of the voltage coupled to transistor 19 exceeds the threshold voltage of transistor 19.

After transistor 18 is disabled, resistor 22 slowly discharges capacitor 21. Eventually capacitor 21 is discharged to a value that is less than the threshold voltage of transistor 19 and transistor 19 is disabled. The values of resistor 22 and capacitor 21 form a time period that determines the time that transistor 19 is enabled for discharging the capacitance of transistor 18 in order to disable transistor 18. After transistor 19 is disabled, transistor 18 is slowly enabled once again by circuit 14 through a resistor 23. The short condition typically still exists, thus, as transistor 18 is slowly enabled by circuit 14 the value of load current 15 also slowly increases to the current limit value established by the Current Limit block of circuit 14. Typically the current limit value is much greater than the operational value of load current 15 but is much less that the short circuit value. Eventually, the Thermal Limit block will once again disable transistor 18.

In one example of a circuit without the transient suppression circuit, a short occurred during the operation of load 11. The short resulted in a load current spike from an operational value of about five Amps (5 Amps) prior to the short to a short circuit current of over one hundred Amps (100 Amps) after the short. The Current Limit block of circuit 14 became active after about ten (10) micro-seconds and limited the load current to a current limit value of about fourteen Amps (14 Amps). The long duration of the high load current value could damage load 11. The large current spike over such a long time may also cause the voltage on the bus that is connected to input 12 and return 13 to sag to a lower than desired value.

Adding the transient suppression circuit that includes transistor 19, capacitor 21, and resistor 22, reduced the duration of the short circuit current spike to about one (1) micro-second. This short duration is not sufficient to damage load 11. Additionally the voltage on input 12 and return 13 remained stable.

In order to facilitate this operation, transistor 18 has a drain connected to return 17, a source connected to return 13, and a gate connected to an output of circuit 14 through resistor 23. Transistor 19 has a drain connected to the gate of transistor 18, a gate connected to a first terminal of resistor 22, and a source connected to return 13. A second terminal of resistor 22 is connected to return 13. Capacitor 21 has a first terminal connected to the drain of transistor 18 and a second terminal connected to the gate of transistor 19. Load 11 has a voltage supply input connected to terminal 16 and a voltage common terminal connected to return 17.

Figure 3:
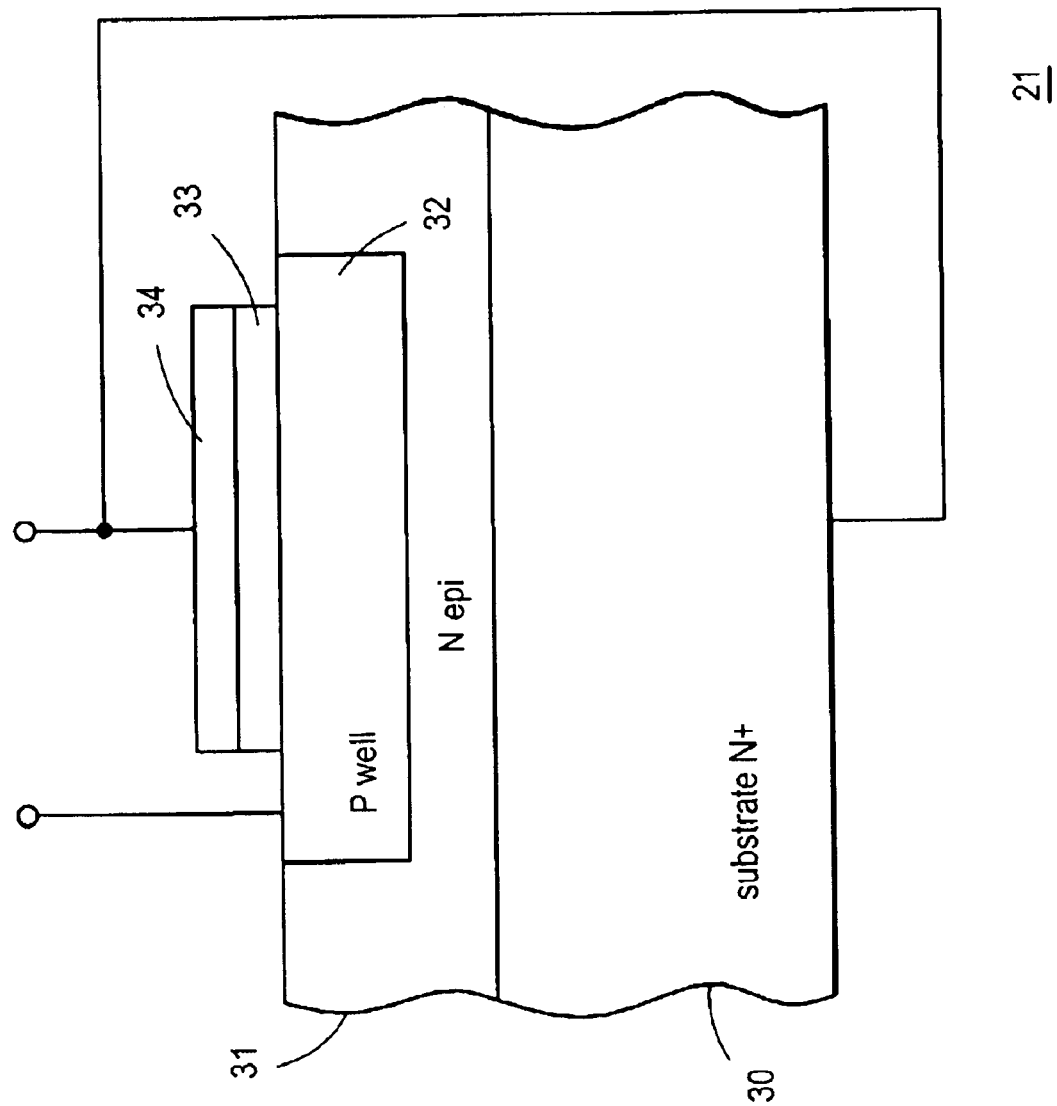
FIG. 3 schematically illustrates an enlarged cross-sectional portion of an embodiment of a capacitor of the protection circuit of FIG. 1 in accordance with the present invention.

FIG. 3 schematically illustrates an enlarged cross-sectional portion of an embodiment of capacitor 21. Capacitor 21 must be formed to withstand the full voltage applied between input 12 and return 13. Preferably, capacitor 21 is formed on a semiconductor die with transistor 18. In the preferred embodiment, transistor 18 is a vertical N-channel power FET and transistor 19 is a lateral N-channel power FET that has a lower current capacity that transistor 18. Capacitor 21 is formed as a junction capacitor on an N-type semiconductor substrate 30. An N-type epitaxial layer 31 is formed on substrate 30. A P-type well 32 is formed on layer 31 and the junction between well 32 and layer 31 forms the junction capacitor. Preferably, one side of capacitor 21 is tied to the drain of transistor 18 to facilitate forming the junction capacitor utilizing the same high voltage junction as transistor 18. Additionally, the capacitance value may be increased by forming another parallel capacitor using a dielectric layer 33, such as an interlayer dielectric, and a conductor 34. This capacitor would be in parallel with the junction capacitor. Typically the interlayer dielectric breakdown voltage is well in excess of 100 V and facilitates forming a high breakdown voltage for capacitor 21.

FIG. 4 schematically illustrates an enlarged plan view of a portion of an embodiment of a semiconductor device 40 that is formed on a semiconductor die 41. Die 41 includes substrate 30, layer 31, and well 32. Protection circuit 10 is formed on die 41. In most embodiments, load 11 is external to die 41. Die 41 may also include other circuits that are not shown in FIG. 4 for simplicity of the drawing.

In view of all of the above, it is evident that a novel device and method is disclosed. Included, among other features, is disabling an output transistor when a short circuit is detected. Coupling the short circuit voltage to a gate of a disable transistor facilitates quickly disabling the load transistor and preventing damage to the load.

While the invention is described with specific preferred embodiments, it is evident that many alternatives and variations will be apparent to those skilled in the semiconductor arts. More specifically the invention has been described for a particular N channel power transistor structure, although the method is directly applicable to other transistors.

What is claimed is:

1. A method of forming a protection circuit comprising:
   forming a first transistor to couple a load return of the protection circuit to a voltage return of the protection circuit; and
   coupling a second transistor to disable the first transistor when a voltage value of the load return exceeds a first voltage value.

2. The method of claim 1, wherein coupling the second transistor to disable the first transistor when the voltage value of the load return exceeds the first voltage value includes forming the protection circuit to couple the voltage value of the load return to a control electrode of the second transistor.

3. The method of claim 2 wherein forming the protection circuit to couple the voltage value of the load return to the control electrode of the second transistor includes forming a capacitor coupled between the control electrode of the second transistor and the load return.

4. The method of claim 3 further including forming a resistor coupled to discharge the capacitor.

5. The method of claim 2 further including forming the protection circuit to disable the first transistor after a time period.

6. The method of claim 1 wherein coupling the second transistor to disable the first transistor when the voltage value of the load return exceeds the first voltage value includes coupling the second transistor to disable the first transistor when the voltage value of the load return exceeds a threshold voltage of the second transistor.

7. The method of claim 1 further including forming the protection circuit to include a thermal limit block and a current limit block.

8. A method of protecting a circuit comprising:
enabling a first transistor to couple a load return of the circuit to a voltage return of the circuit; and
enabling a second transistor to disable the first transistor for a time period when a voltage value of the load return exceeds a first value.

9. The method of claim 8 further including disabling the second transistor after the time period expires.

10. The method of claim 8 wherein enabling the second transistor to disable the first transistor-for the time period includes coupling the voltage value of the load return through a capacitor to a control electrode of the second transistor.

11. The method of claim 10 further including discharging the capacitor to the voltage return to terminate the time period.

12. The method of claim 11 wherein discharging the capacitor to the voltage return to terminate the time period includes discharging the capacitor through a resistor coupled between the capacitor and the voltage return.

13. The method of claim 8 wherein enabling the first transistor to couple the load return to the voltage return includes enabling a vertical MOS power FET.

14. The method of claim 13 wherein enabling the second transistor includes enabling a lateral MOS power FET.

15. The method of claim 8 wherein enabling the second transistor to disable the first transistor for the time period when the voltage value of the load return exceeds the first value includes enabling the second transistor to disable the first transistor for the time period when the voltage value of the load return exceeds a threshold voltage of the second transistor.

16. A protection circuit comprising:
a voltage input;
a voltage return;
a load return;
a first transistor coupled between the load return and the voltage return, the first transistor having a control electrode;
a second transistor coupled between the control electrode of the first transistor and the voltage return, the second transistor having a control electrode; and
a capacitor coupled between the load return and the control electrode of the second transistor.

17. The protection circuit of claim 16 further including a resistor coupled between the control electrode of the second transistor and the voltage return.

18. The protection circuit of claim 16 further including a load coupled between the voltage input and the load return.

\* \* \* \* \*